though for a propylene polymer. The propylene polymers employed in the preparation of this propylene polymers are crystalline homopolymer of propylene polymers having is tion does not cause a significant
United States Patent Office

3,644,580
Patented Feb. 22, 1972

3,644,580
COPOLYMERS OF PROPYLENE AND AN AMINO-SUBSTITUTED ACRYLIC COMONOMER
William J. Craven, Passaic, N.J., assignor to Dart Industries Inc., Los Angeles, Calif.
No Drawing. Continuation of application Ser. No. 600,036, Dec. 8, 1966. This application Feb. 16, 1970, Ser. No. 10,098
Int. Cl. C08f 15/04
U.S. Cl. 260—878
6 Claims

ABSTRACT OF THE DISCLOSURE

A substantially linear copolymer of propylene and an amino-substituted acrylic comonomer is disclosed which is susceptible to dyeing and printing. The copolymer comprises a first segment which is a crystalline propylene polymer and having attached to an end thereof a second segment which is a polymer of an amino-substituted acrylic monomer having the formula

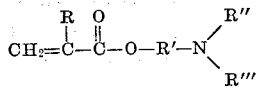

wherein R is hydrogen or a methyl group, R' is an alkylene group having 1 to 8 carbon atoms and R" and R'" are hydrogen or alkyl groups having 1 to 4 carbon atoms.

---

This application is a continuation of application Ser. No. 600,036, filed Dec. 8, 1966, now abandoned.

PROPYLENE BLOCK COPOLYMERS

The present invention relates to novel block copolymers of propylene and more particularly to novel block copolymers of propylene polymers and functionally substituted acrylic monomers.

High molecular weight, crystalline polymers of propylene are finding increasing commercial utility in the form of film and fibers. Although endowed with many superior properties, one of the greatest disadvantages of these polymers is their inability to be dyed in fiber form and their inability to be printed on in film form. Various methods have been advocated to overcome this problem such as post-treatments of the shaped articles, addition of compounds which increase the dyeability of the resulting composite fiber or the addition of pigments to the polymer prior to its shaping. All of these methods, however, have substantial drawbacks. Thus, the post-treatment of films and fibers is not only expensive but difficult to carry out on a commercial scale. The addition of compounds to the propylene polymer can result in the exudation of such during use of the fiber or film thereby affecting the shade and color of the material. The exudate may, furthermore, be harmful to the material in contact with the propylene polymer. In addition, the physical properties of the propylene polymer can be adversely affected by the addition of such compounds. The use of pigments added to the polymer prior to the formation of the fiber seriously limits choices of colors available, requires large mixing facilities and a large stock of polymer, does not allow the printing of fabrics and film and frequently poses problems in the matching of different batches of the same pigmented polymer. Although copolymerization of propylene with monomers capable of accepting dyes has been suggested to impart dyeability such copolymerization has frequently an adverse affect on the reactivity of the propylene in forming a polymer, in causing low polymerization rates and/or the formation of low molecular weight polymer. The direct copolymerization of monomers capable of accepting dyes with the propylene can further cause a significant deterioration of desirable mechanical properties.

It is an object of the present invention to provide novel propylene polymers.
It is a further object of the present invention to provide novel propylene polymers having improved dyeability and printability.
It is still another object of the present invention to provide dyeable polymers of propylene in which the modification does not cause a significant deterioration of desirable mechanical properties.
Yet a further object of the present invention is to provide dyeable propylene polymers which are block copolymers of propylene and monomers capable of accepting dyes which do not deleteriously affect the physical properties of the propylene polymer.
Other objects will become apparent from the following description and claims.

The novel polymers of the present invention are block copolymers of a propylene polymer and of a polymerized amino-substituted acrylic monomer having the general formula:

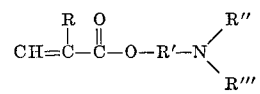

wherein R is a hydrogen or a methyl group, R' is an alkylene radical of 1 to 8 carbon atoms and R" and R'" are hydrogen or alkyl radicals of 1 to 4 carbon atoms.

The novel propylene polymers are obtained by the copolymerization of the amino-substituted acrylic monomer having the indicated formula with a preformed polymer of propylene. The propylene polymers employed in the formation of the novel block copolymers of the present invention are crystalline homopolymers of propylene and crystalline random or block copolymers of ethylene. Crystalline as employed herein is defined as exhibiting crystallinity when an annealed sample of the polymer is subjected to X-ray analysis. The preparation of polypropylene and either type of ethylene-propylene copolymers is well-known in the art. In general these polymers are prepared from their monomers by polymerization with organometallic complex catalysts frequently referred to as "Ziegler" catalysts. These catalysts are obtained by the reaction of transition metal halides and particularly titanium halides with metal hydrocarbyl compounds and particularly aluminum trialkyls, alkyl aluminum halides and alkyl aluminum hydrides. Random copolymers of propylene and ethylene are obtained by polymerization of mixtures of propylene and ethylene while block copolymers are obtained by sequential polymerization of propylene and ethylene using the same catalyst. The specific details of the polymerization methods involved are described in the literature and well-known to those skilled in the art and for that reason need not be detailed here.

The amino-substituted acrylic monomer employed to form the block copolymer of the present invention is then polymerized in the presence of the propylene polymer in a manner such as to form a block copolymer. Extraction studies of the block copolymer show that the polymerized amino-substituted acrylic comonomer is attached to the hydrocarbon polymer although the specific mechanism by which this occurs is not clearly understood. However, it is to be pointed out that some minor amounts of homopolymer can be formed depending on the particular reaction conditions employed; such amounts can be removed by extraction if deemed undesirable. The polymerized amino-substituted acrylic comonomer content can be varied within the range of 0.1 to 25% by weight of the block copolymer. Any optimum concentration of amino-substituted acrylic comonomer in the propylene polymer will vary with the particular propylene polymer, the particular amino substituted acrylic comonomer and the intended utility of the block copolymer. In general, it is preferred to maintain the polymerized amino-substituted comonomer content in the range of 1 to 15% by weight of the block copolymer. Suitable polar comonomers employed in the formation of the novel block copolymers of the present invention include dimethylaminoethyl methacrylate, dimethylaminoethyl acrylate, methylaminoethyl methacrylate, methylaminoethyl acrylate, aminoethyl acrylate, aminomethyl acrylate, diethylaminoethyl acrylate, ethylaminoethyl methacrylate, diethylaminoethyl methacrylate, diethylaminoethyl acrylate, dimethylaminopropyl acrylate, 3-(dimethylamino) butyl acrylate, 4-(dimethylamino) butyl acrylate, 4-(dimethylamino) butyl methacrylate, 4-(methylamino) acrylate, 4-(methylamino) methacrylate and 6-(dimethylamino)-2-ethylhexyl acrylate.

The preferred method of obtaining the block copolymers of the present invention comprises a sequential polymerization of the olefin, e.g., propylene or propylene and ethyl followed by the polymerization of the amino-substituted acrylic monomer. Although some block copolymerization is obtained by directly adding the amino-substituted acrylic monomer to the propylene polymer after its formation and prior to the deactivation of the organo-metallic catalyst, it is preferred to alter the polymerization environment to greatly improve its ability to cause the amino-substituted acrylic monomer to copolymerize with the propylene polymer. The method involved in altering the polymerization environment is described in greater detail in copending application S.N. 600,039 filed Dec. 8, 1966, now U.S. 3,458,598. Basically the block copolymerization there described involves a three-step process in which, as applicable to the novel block copolymers of the present invention, in the first step a mixture of the solid propylene polymer, free of unreacted olefin monomer and the described organo-metallic complex catalyst is formed; in a second step this mixture is treated with a nitrogen compound and oxygen which are then removed from the polymer mixture; and in a third step, the activated polymer mixture is contacted with the amino-substituted acrylic monomer until the block copolymer is obtained. Preferably the polymer mixture formed in the first step is one resulting from the polymerization of the propylene or the ethylene and the propylene containing the organo-metallic complex catalyst before any deactivation of the catalyst has occurred. Any is removed prior to the activation of the reaction for polymerization with the acrylic monomer. The solid polymer catalyst mixture is then treated with a nitrogen compound which is preferably ammonia, although other nitrogen compounds such as gaseous primary, secondary and tertiary amines can also be employed, by passing an excess of ammonia at a pressure of 0.1 to 10 p.s.i.g. through the ploymer catalyst mixture. The NH$_3$-treated mixture is then purged with an inert gas such as argon and a stream of oxygen is passed through the mixture which is in turn purged with an inert gas. Although it is preferred to separately treat the mixture with the nitrogen compound and then with the oxygen, mixtures of NH$_3$ and O' can be employed. The temperature at which the gas treatment is carried out is not critical and can be varied widely. Generally the temperature should not exceed the melting point of the polymer so that the polymer exists in the solid phase during the treatment with the activating gases. Operable temperatures are thus in the range of 60° F. to 250° F. and preferred temperatures in the range of 60° F. to 150° F.

The third step in the preferred block copolymerization method employed to form the novel propylene block copolymers of the present invention comprises the addition of the amino-substituted acrylic monomer to the treated solid polymer reaction mixture. The block copolymerization is conducted by adding the monomer in liquid form to the activated solid polymer mixture. Since the polymerization is generally exothermic, it is frequently not necessary to heat the treated polymer in order to cause block copolymerization to occur. In general, a reaction temperature of 60° F. to 250° F. and preferably of 90° F. to 160° F. is maintained. The liquid comonomer can be added in bulk or in the form of a solution, the latter being employed when block copolymers having low contents of the amino-substituted acrylic monomer are desired. Use of solvents is also advantageous to suppress any homopolymerization of the amino-substituted acrylic monomer.

The extent or degree of block copolymerization depends on the reaction conditions employed and will vary from monomer to monomer. However, in general, a larger quantity of the amino-substituted acrylic comonomer will result in a higher degree of block copolymerization as will a lower polymerization temperature. In general, an excess of between 10–100% of the polar comonomer content desired in the block copolymer is employed. Preferably, the excess is between 20–40%. Reaction times will vary but, in general, the reaction is allowed to go to completion as measured by temperature changes. Solvents which are in particular employed in combination with the polar comonomer are solvents capable of dissolving the polar comonomer but otherwise remaining inert in the system. Particularly suitable solvents are hydrocarbon solvents such ah hexane, cyclohexane, heptane, benzene, xylene, and the like.

Although it is preferred to employ solely the amino-substituted acrylic monomer in order to prepare the block copolymers of the present invention, it is to be recognized that block copolymers obtained by polymerizing mixtures of the amino-substituted acrylic monomers with other polar comonomers and particularly alkyl esters of acrylic and methacrylic acids, acrylic and methacrylic acid, acrylonitrile, and styrene with the activated propylene polymer are included within the scope of the present invention.

The product obtained from the block copolymerization is then purified by removing unreacted polar comonomer and by deactivating and precipitating catalyst residues by techniques heretofore developed in the purification of olefin polymers prepared by polymerization with the described organo-metallic catalysts. Such methods can involve the washing of the solid polymer product with water, dilute hydrochloric acid, alcohol, or any combination thereof, or by employing alcohol solutions containing chelating agents capable of chelating with the metallic components of the catalyst as has been described in the literature. If any significant amounts of polar comonomer homopolymer are formed in the block copolymerization, these can be removed by selective extraction with slightly polar organic solvents such as esters, ketones, and ethers. The use of solvent during the block copolymerization can enhance the homogeneity of the block copolymer obtained. Further homogenization of the block copolymer can also be obtained by melt-blending the polymer after its separation from unreacted monomer and after the removal of catalyst residues. Such melt-blending can be carried out in an extruder or many of the other devices heretofore developed for the melt-blending of thermoplastic resins.

The block copolymers can furthermore be blended with unmodified propylene polymers if it is desired to reduce the amino-substituted acrylic comonomer content of any particular comonomer.

The resulting block copolymers are fabricated into films, fibers, and other shapes according to methods heretofore employed for propylene polymers. In such fabricated shapes, the block copolymers of the present invention exhibit greater dye acceptance than propylene polymers not so modified without significantly affecting desirable mechanical properties exhibited by the unmodified propylene polymer. The block copolymers of the present invention show particularly superior dye acceptance with acid dyes.

The present invention has been described in particular detail with respect to the modification of propylene polymers. It is to be recognized that the same methods are applicable to the formation of block copolymers from other alpha olefin polymers when in admixture with the described organometallic complex catalysts with the amino-substituted acrylic monomers.

The preparation and properties of the novel block copolymers of the prseent invention are further illustrated by the following examples wherein all parts and percentages are by weight unless otherwise stated.

EXAMPLE I

To a heated one liter steel reactor is added 0.65 gram of aluminum chloride-titanium chloride, $AlCl_3 \cdot 3TiCl_3$, followed by 8.4 cc. of one molar diethyl aluminum monochloride, corresponding to a molar Al/Ti ratio of 2. The reaction vessel is pressured with 15 p.s.i.g. of hydrogen gas and 400 ml. of liquid propylene monomer is added. The stirred reaction mixture is warmed from 75° F. to 140° F. where the temperature is maintained for 40 minutes. The reactor is depressurized and purged with argon gas for 15 minutes to remove traces of propylene monomer. The system is closed to the atmosphere and 3 p.s.i.g. of ammonia gas is added to the reactor polypropylene. After stirring for 5 minutes, the ammonia is vented and its traces purged by an argon stream. The system is closed and 10 p.s.i.g. of oxygen pressured into the reactor. After 5 minutes additional stirring, the oxygen is vented and the reactor purged briefly with argon gas.

To the reactor is then added 50 ml. of distilled dimethyl aminoethyl methacrylate at 96° F. An exothermic reaction ensues, which raises the temperature to 141° F., where it remains without additional heat for 40 minutes. The reactor is then cooled and disassembled. The reaction product is washed twice with equal parts of a hot isopropanol-heptane mixture. The resulting dried polypropylene-poly(dimethylaminoethyl methacrylate) block copolymer weighs 230 grams, has a density of .933 g./cc. and a melt index (ASTM-D-1238-62T) at 230° C. of 5.0. Infrared analysis shows the product contains 9% of dimethylaminoethyl methacrylate. Extraction of a portion of the product with ethyl acetate does not affect the methacrylate content of the polymer. This indicates the formation of a block copolymer.

A sample of the block copolymer is melt spun into 5 mil diameter monofilaments. A 2 gram portion of the fiber is immersed in a dilute acid dye bath containing .5% of martius yellow. After ten minutes at about 50° C., the fiber is removed from the dyebath and scrubbed with a 1% solution of a commercial detergent. The yellow colored fiber is then rinsed with water and dried. No change in color is observed when a sample of the dyed fiber is drycleaned at 50° C. for one hour in a solution made with carbon tetrachloride ligoin and amyl alcohol.

The block copolymer was blended with additional polypropylene to reduce the poly(dimethylaminoethyl methacrylate) content to 3%. The resulting polymer when melt spun into fibers exhibited excellent dye acceptance.

EXAMPLE II

The polymerization procedure of Example I is repeated except that the oxygen treatment step is omitted. The resulting block copolymer has a density of 0.909 g./cc. and a melt index at 230° C. of 2.1. Infrared analysis shows the block copolymer to contain 1.5% of polymerized dimethylaminoethyl methacrylate.

EXAMPLE III

Following the procedure of Example I, a polypropylene is produced. To the resulting reaction mixture is then added 12 grams of ethylene at a rate of 2 grams per minute and polymerization is continued for an additional ten minutes. The reaction mixture is then vented and treated with ammonia and oxygen as in Example I. The activated polyethylene/polypropylene block copolymer is copolymerized with dimethylaminoethyl methacrylate as described in Example I. A block polymer of polypropylene/polyethylene/poly(dimethylaminoethyl) methacrylate is obtained.

EXAMPLE IV

The procedure of Example I is repeated employing methylaminoethyl acrylate instead of the dimethylaminoethyl methacrylate. A polypropylene-poly(methylaminoethyl acrylate) block copolymer is obtained.

The foregoing examples have illustrated the formation and properties of the novel block copolymers of the present invention. It will be apparent from the foregoing examples that other amino-substituted acrylic monomers coming within the scope of the present invention can be block copolymerized by the methods set forth in the examples and it is not intended to limit the scope of the invention to the particular embodiments illustrated in the examples. Various modifications and variations of the invention described will be apparent to those skilled in the art and are included within the scope of the invention.

I claim:

1. A substantially linear copolymer consisting of first segment which is a crystalline homopolymer of propylene or a block or random block copolymer of propylene and ethylene and a second segment of a polymer of a monomer having the formula

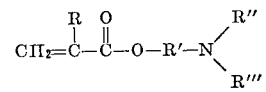

wherein R is hydrogen or a methyl group, R' is an alkylene radical having 1 to 8 carbon atoms, and R'' and R''' are hydrogen or alkyl radicals having 1 to 4 carbon atoms; said second segment forming 0.1 to 25% by weight of the copolymer.

2. A copolymer according to claim 1 wherein the first segment is polypropylene.

3. A copolymer according to claim 2 wherein R' is ethylene and R'' and R''' are methyl.

4. A copolymer according to claim 1 wherein the monomer is dimethyl amino ethyl methacrylate.

5. A copolymer according to claim 1 wherein the monomer is dimethyl amino ethyl methacrylate or dimethyl amino ethyl acrylate.

6. A copolymer according to claim 1 in the form of a film or fiber.

References Cited

UNITED STATES PATENTS

| | | | |
|---|---|---|---|
| 3,073,667 | 1/1963 | Bonvicini et al. | 260—878 |
| 3,131,990 | 5/1964 | Bonvicini et al. | 260—878 |
| 3,141,862 | 7/1964 | Kirshenbaum et al. | 260—877 |
| 3,293,326 | 12/1966 | Jezl et al. | 260—878 |
| 3,342,900 | 9/1967 | Marans | 260—878 |
| 3,308,108 | 3/1967 | Feldhoff | 260—878 |
| 3,399,249 | 8/1968 | Hostetler | 260—878 |

HARRY WONG, JR., Primary Examiner

U.S. Cl. X.R.

260—897